United States Patent
Kaku

Patent Number: 6,104,748
Date of Patent: Aug. 15, 2000

[54] SPREAD SPECTRUM SIGNAL RECEIVING APPARATUS

[75] Inventor: Tomoya Kaku, Tokyo, Japan

[73] Assignee: NEC Corporation, Tokyo, Japan

[21] Appl. No.: 08/662,215

[22] Filed: Jun. 11, 1996

[30] Foreign Application Priority Data

Jun. 15, 1995 [JP] Japan ................................. 7-149026

[51] Int. Cl.⁷ .............................................. H04B 15/00
[52] U.S. Cl. ...................................... 375/200; 375/340
[58] Field of Search ................................... 375/200, 206, 375/261, 340, 327; 370/206, 335, 342, 441, 522

[56] References Cited

U.S. PATENT DOCUMENTS

| | | | |
|---|---|---|---|
| 5,093,841 | 3/1992 | Vancraeynest | 375/206 |
| 5,574,754 | 11/1996 | Kurihara et al. | 375/208 |
| 5,666,352 | 9/1997 | Ohgoshi et al. | 370/206 |
| 5,712,869 | 1/1998 | Lee et al. | 375/206 |
| 5,745,531 | 4/1998 | Sawahasi et al. | 375/345 |
| 5,768,306 | 6/1998 | Sawahashi et al. | 375/206 |

FOREIGN PATENT DOCUMENTS

| | | |
|---|---|---|
| 2-92035 | 3/1990 | Japan. |
| 3-101534 | 4/1991 | Japan. |
| 5-308345 | 11/1993 | Japan. |

Primary Examiner—Chi H. Pham
Assistant Examiner—Emmanuel Bayard
Attorney, Agent, or Firm—Ostrolenk, Faber Gerb & Soffen

[57] ABSTRACT

A receiving apparatus in a spread spectrum system includes a quadrature-demodulating section for demodulating a received signal in accordance with a clock signal to generate first and second quadrature components of an information signal and first and second quadrature components of a pilot signal and a spreading code generating section for generating a spreading code sequence which is the same as used on a transmission side, for each of the information signal first and second quadrature components and pilot signal first and second quadrature components in response to the clock signal. A despreading section despreads each of the information signal first and second quadrature components and pilot signal first and second quadrature components by use of the corresponding generated spreading code sequence. A clock signal generating section generates the clock signal in accordance with a frequency control signal to supply the clock signal to the quadrature-demodulating section and the spreading code generating section. A frequency control signal generating section generates the frequency control signal from the despread pilot signal first and second quadrature components.

37 Claims, 8 Drawing Sheets

SPREAD SPECTRUM SIGNAL RECEIVING APPARATUS

BACKGROUND OF THE INVENTION

1. Field of the Invention

The present invention relates to a communication system, more particularly, to a receiving apparatus of a spread spectrum signal.

2. Description of Related Art

For a multiple access system in which a plurality of stations communicate with each other using an allocated frequency band, there are proposed various communication systems such as a frequency division multiple access (FDMA) system, a time division multiple access (TDMA) system and a code division multiple access (CDMA) system. In most of these systems, a service area is divided into a plurality of small cells and a base station is located in each of the plurality of cells. A subscriber communicates with another subscriber via the base station.

Among these multiple access systems, because the CDMA system does not require burst synchronization, it is suitable as a communication system composed of many subscriber equipments. Also, the CDMA system has the advantage that it is not affected by interference and noise. As a result, the CDMA system is receiving much attention. The CDMA system using the spread spectrum communication system is one multiple access system in which different spreading code sequences are assigned to users and spreading modulation is performed using the spreading code sequences, respectively. As a result, the same frequency band can be used by many users in a cell.

As already known, it is assumed in the spread spectrum communication system that the spreading code sequence used on a transmission side is synchronous with used on a reception side when a received signal is despread. Therefore, for instance, in a case where the phase of spreading code sequence is shifted over one chip due to influence of change of a delay amount on a transmission path which depends on multiple paths or the like, it becomes difficult to accurately demodulate data. Hence, in the spread spectrum communication system, synchronization confinement (initial synchronization) and synchronization tracking (synchronization holding) are absolutely necessary. Normally, the synchronization confinement confines the difference in phase between a spreading code sequence on the transmission side and a spreading code sequence on the reception side into a sufficiently small range (normally below ½ chip). The synchronization tracking always keeps a synchronization position captured once with the precision below ½ chip such that the captured synchronization position is not lost because of influence of noise and modulation. For this reason, the synchronous control and stabilization control of a clock signal used in a receiving apparatus are important.

An example of such a conventional spread spectrum communication system will be described with reference to FIGS. 1 and 2A to 2C. FIG. 1 is a block diagram of the structure of a conventional spread spectrum signal receiving apparatus. FIGS. 2A to 2C are diagrams to explain the operation of a delay locked loop (DLL) circuit as a conventional frequency synchronizing circuit. In the receiving apparatus, the same spreading code sequence(a PN code sequence) as multiplied in the transmitting apparatus is generated by a spreading code generator 123 (the spreading code sequence used in the demodulation is referred to as "PN(0)" hereinafter). The generated spreading code sequence is multiplied in multipliers $126_3$ and $126_4$ for despreading. Thus, despreading demodulation is performed.

However, in this case, it is necessary to synchronize PN(0) with the spreading code sequence multiplied in the transmitting apparatus. For this reason, quasi-synchronization detection is performed to the received signal using a quadrature demodulator 102 composed of a shifter 122 and a local oscillator 121 generating a signal having the frequency approximately equal to that used in the transmitting apparatus to obtain an in-phase component and quadrature component (to be referred to as "I component and Q component" hereinafter ). The spreading code generator 123 independently generates, for each of the obtained I and Q components, a spreading code sequence having a phase slightly proceeding than the spreading code sequence used for despreading demodulation (typically, ½ chip) (to be referred to as "PN(+)" hereinafter) and a spreading code sequence having a phase delayed to the same extent (to be referred to as "PN(-)" hereinafter).

The received signal is multiplied by the respective spreading code sequences in multipliers $126_5$ and $126_6$ for despreading. High frequency components are removed from the multiplied signals by low pass filters $127_2$ and $127_3$ (to be referred to as "LPFs" hereinafter) for smoothing. As a result, despreading demodulation outputs of the I and Q components are obtained. A synthesis correlation signal of the spreading demodulation outputs of the I and Q components is inputted to a frequency control signal calculating circuit 125 for comparing the phases of spreading code sequences.

A frequency control signal is calculated for a voltage controlled oscillator (VCO) 124 and frequency synchronization is controlled in the spreading code generator 123 and the local oscillator 121 which are driven in accordance with a clock signal generated by the VCO 124, such that frequency synchronization with a carrier of the received signal is established and frequency synchronization with a local signal is established.

In this case, the I and Q component signals inputted to the frequency control signal calculating circuit 125 have the correlation output characteristics J and K shown in FIGS. 2A and 2B as the despreading correlation outputs depending on the received signal, PN(+) and PN(-). When these correlation outputs are added or subtracted by an adder 128, a synthesis correlation output characteristic L is obtained as the synthesis correlation output of J and K for each of the I and Q components, as shown in FIG. 2C. The frequency control signal to the VCO 124 which is used for the spreading code generator 123 is determined from the synthesis correlation output characteristics L for the I and Q components. In actuality, PN(0) of the spreading code generator 123 tracks the spreading code sequence of the received signal multiplied in the transmitting apparatus such that synchronization with the spreading code sequence is established. As a result, a middle point of the maximum output value and minimum output value of the synthesis correlation output characteristic L is set to "0". That is, the control is performed to stably generate the spreading code sequence PN(0) which is used for demodulation, at a point L0 of FIG. 2C.

As examples of such a conventional technique, there are the systems disclosed in Japanese Laid Open Patent Disclosures (JP-A-Hei3-101534. JP-A-Hei5-308345 and JP-A-Hei2-92035).

However, in the above-mentioned conventional technique, the PN(+) having phase proceeded and the PN(-)

having phase delayed need to be always subjected to the despreading process in addition to the spreading code sequence PN(0) used to demodulate information from the signal actually received. For this reason, the spreading code generators and processing sections need to be provided for the PN(−) and PN(+) so that the circuit size increases.

SUMMARY OF THE INVENTION

The present invention is made in the light of the above-mentioned background and provides a spread spectrum signal receiving apparatus in which the circuit can be simplified and made small in size.

The present invention also provides a method and apparatus for reducing power consumption in a spread spectrum signal receiving apparatus.

In order to achieve an aspect of the present invention, a spread spectrum signal receiving apparatus includes a demodulating section for demodulating a received signal in accordance with a clock signal to generate first and second quadrature components of an information signal and first and second quadrature components of a pilot signal, a spreading code generating section for generating a spreading code sequence which is the same as that used on a transmission side, for each of the information signal first and second quadrature components and pilot signal first and second quadrature components in response to the clock signal, a despreading section for despreading each of the information signal first and second quadrature components and pilot signal first and second quadrature components by use of the corresponding generated spreading code sequence, a clock signal generating section for generating the clock signal in accordance with a frequency control signal to supply to the demodulating section and the spreading code generating section, and a frequency control signal generating section for generating the frequency control signal from the despread pilot signal first and second quadrature components.

The clock signal generating section includes a section such as a voltage controlled oscillator (VCO) for generating the clock signal having a frequency determined based on a frequency control signal.

The frequency control signal generating section includes a section for generating the frequency control signal corresponding to change between a first despread pilot signal composed of the despread pilot signal first and second quadrature components at a first time and a second despread pilot signal composed of the despread pilot signal first and second quadrature components at a second time, or a predetermined coefficient, or both. For the coefficient, there may be provided a selector for selecting one from among two coefficients in accordance with a difference between a power of the first despread pilot signal at a third time and a power of the second despread pilot signal at a fourth time. Preferably, the frequency control signal generating section includes a section for removing high frequency noise components from the despread pilot signal first and second quadrature components.

The spread spectrum signal receiving apparatus may further include a section for detecting a quality of the received signal from the information signal first and second quadrature components and the pilot signal first and second quadrature components, and a summing section for summing the pilot signal first and second quadrature components for a time interval determined based on the detected quality to remove the high frequency noise components.

In order to achieve another aspect of the present invention, a method of demodulating a received signal in a spread spectrum system is provided, comprising the steps of:

demodulating a received signal in accordance with a clock signal to generate first and second quadrature components of an information signal and first and second quadrature components of a pilot signal;

generating a spreading code sequence which is the same as used on a transmission side, for each of the information signal first and second quadrature components and pilot signal first and second quadrature components in response to the clock signal;

despreading each of the information signal first and second quadrature components and pilot signal first and second quadrature components by use of the corresponding generated spreading code sequence;

generating the clock signal in accordance with a frequency control signal; and generating the frequency control signal from the despread pilot signal first and second quadrature components.

DESCRIPTION OF THE PREFERRED EMBODIMENTS

A spread spectrum signal receiving apparatus of the present invention will be described below with reference to the accompanying drawings.

Figure 1:
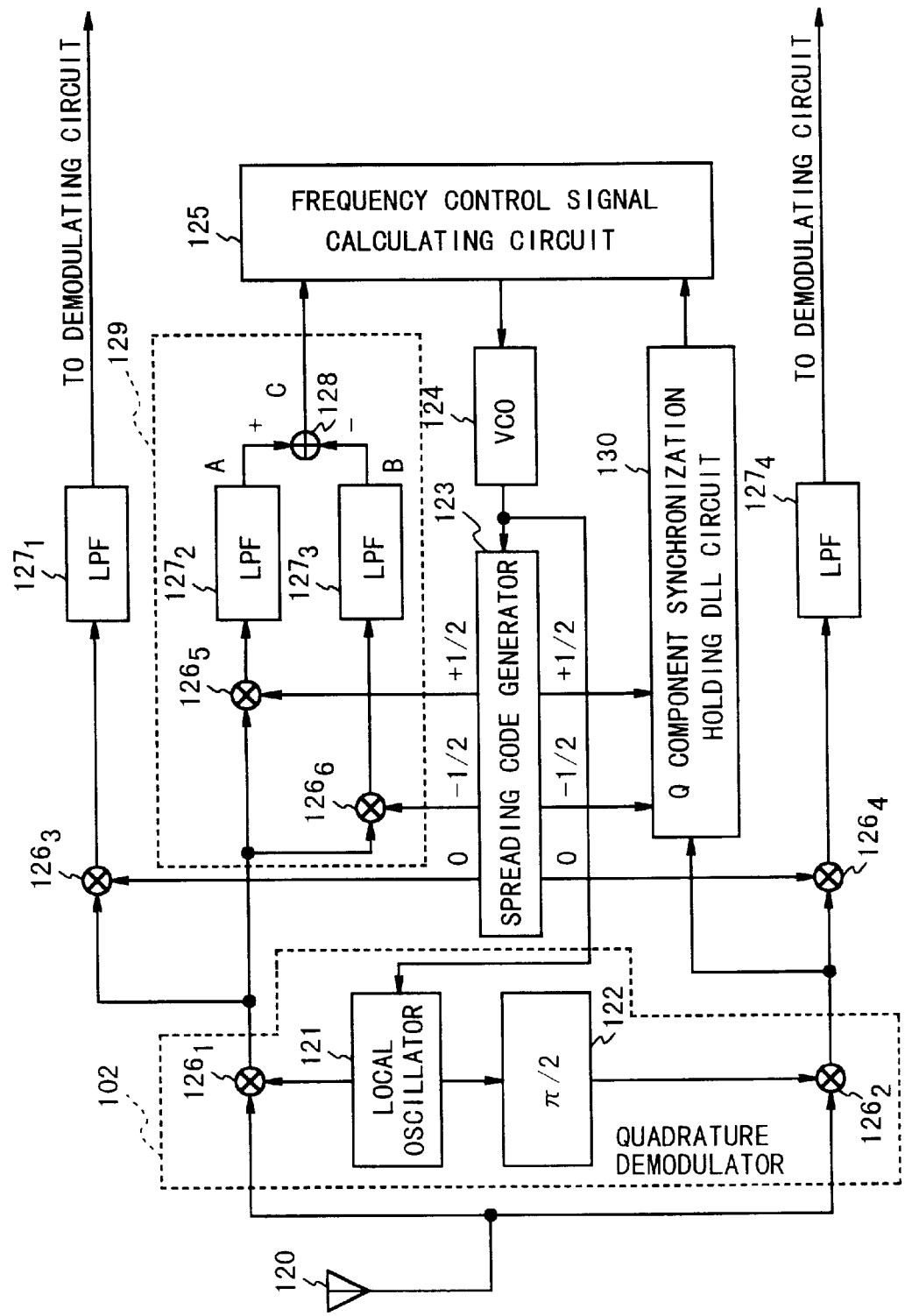
FIG. 1 is a structural block diagram of an example of conventional spread spectrum signal receiving apparatus.
Figure 2:
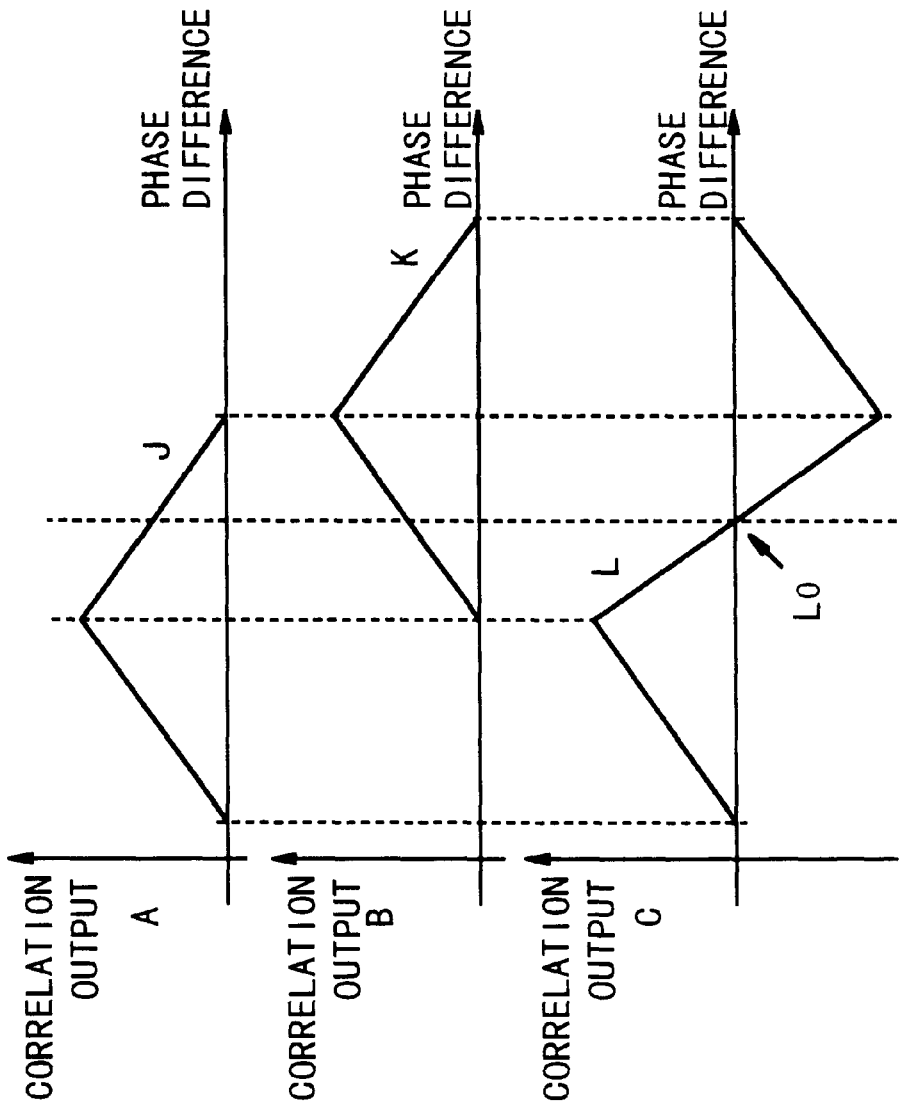
FIGS. 2A to 2C are diagrams for explaining the operation of a conventional DLL circuit.
Figure 3:
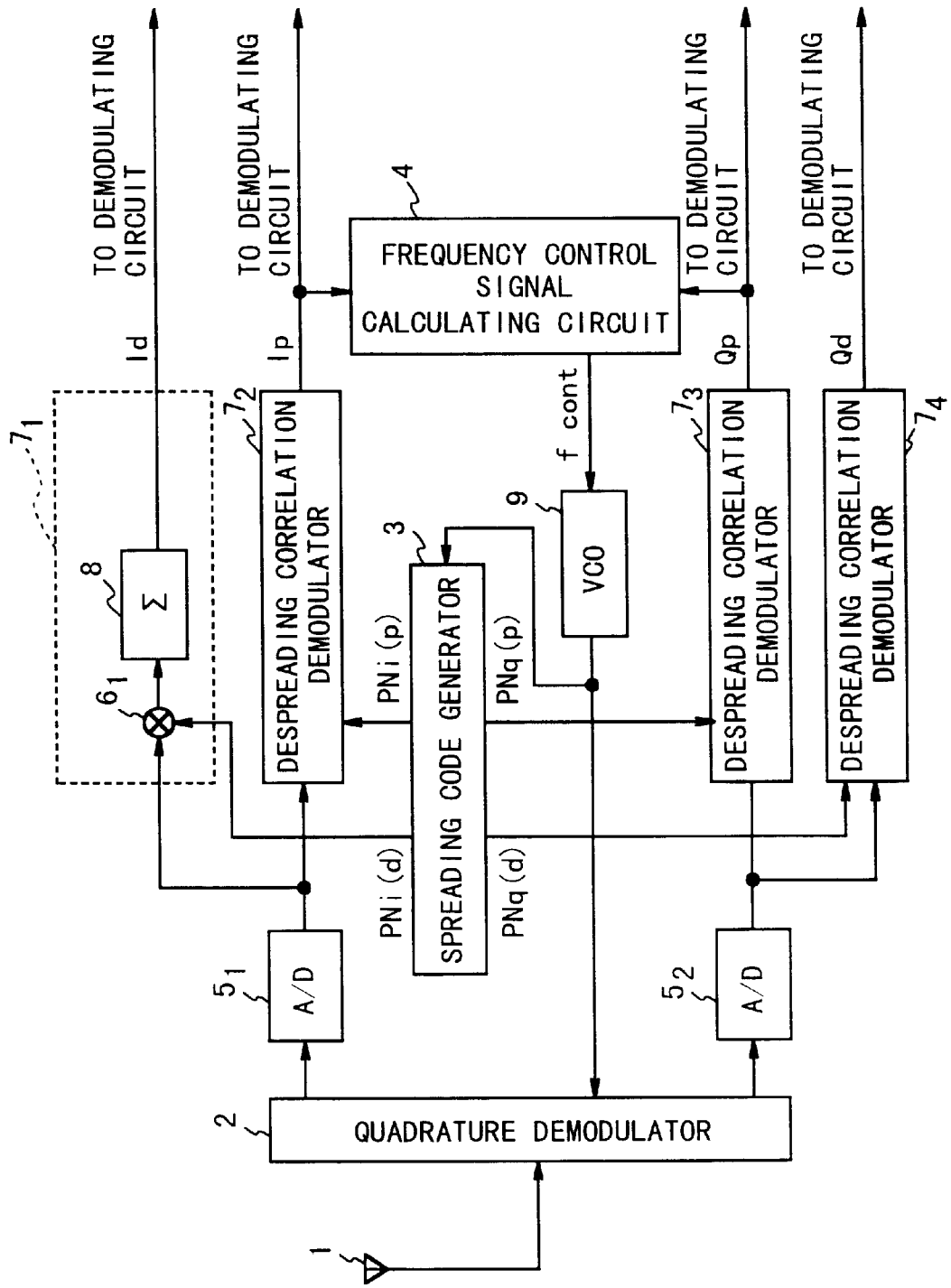
FIG. 3 is a structural block diagram of an apparatus according to an embodiment of the present invention.

FIG. 3 is a block diagram illustrating the structure of the spread spectrum signal receiving apparatus according to the first embodiment of the present invention. Referring to FIG. 3, the spread spectrum signal receiving apparatus is composed of an antenna 1 for receiving a spread spectrum signal composed of an information signal and a pilot signal, a quadrature demodulator 2 for demodulating the received signal based on a reference clock signal to output quadrature signals (I and Q) of each of the information signal and pilot signal, analog to digital (A/D) converter $5_1$ and $5_2$ for converting the quadrature signals into a digital form, despreading correlation demodulators $7_1$ to $7_4$ for inputting these digital quadrature signals to perform despreading corresponding to spreading on a transmitting side to the quadrature signals, a spreading code generator 3 for generating spreading code sequences (PN) in response to the reference clock signal to supply the despreading correlation demodulators $7_1$ to $7_4$, respectively, a voltage controlled oscillator (VCO) 9 for generating the reference clock signal based on a frequency control signal to supply to the spreading code generator 3 and the quadrature demodulator 2, and a frequency control signal calculating circuit 4 for calculating the frequency control signal from the outputs of the despreading correlation demodulators $7_2$ and $7_3$ to supply to the VCO 9.

Next, the principle of the present invention will be described. In TIA.IS95 standardized in North America, an information signal and a pilot signal are always superposed and transmitted as a transmission signal from a transmitting apparatus of a base station. The pilot signal is spread using a spreading code sequence different from a spread code sequence which is used to spread the information signal. For this reason, synchronization between the base station transmitting apparatus and a receiving apparatus can be established by using the pilot signal. In this case, the spectrum spreading is performed using different spreading codes sequence for the in-phase component and quadrature component of a carrier wave to be transmitted.

Figure 4:
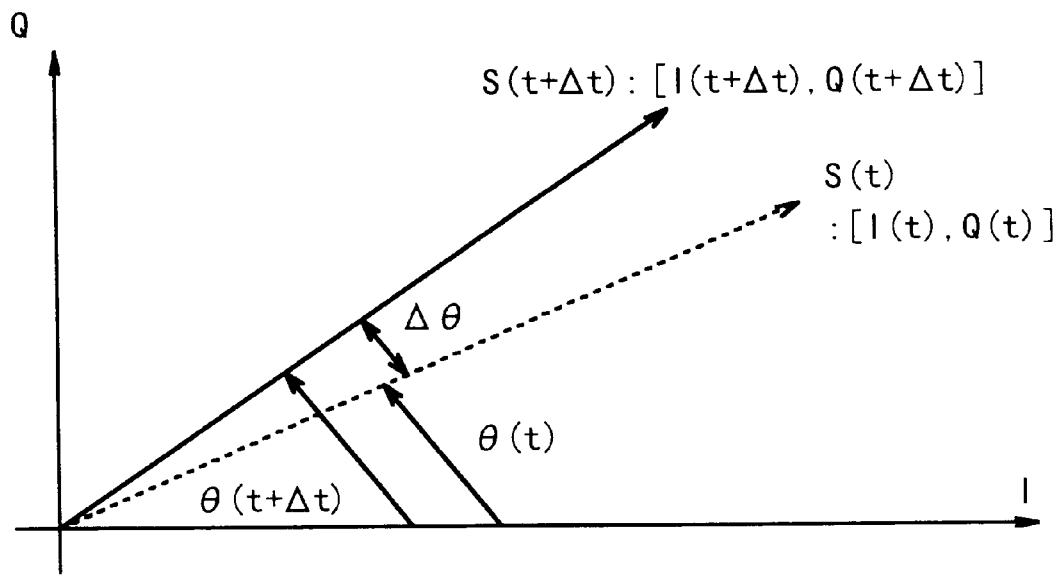
FIG. 4 is a diagram for explaining the principle of the present invention.

Assume as Ip(t) and Qp(t) signals obtained by performing quadrature demodulation to a signal S(t) which is received by the receiving apparatus at a time t and by despreading an in-phase component signal and a quadrature component signal (to be referred to as "I component and Q component" hereinafter) of the pilot signal using PN code sequences used for the spreading in the transmitting apparatus. Similarly, assume as Ip(t+Δt) and Qp(t+Δt) signals obtained by despreading a signal S(t+Δt) received after the time t by Δt. The signals received at these different times are shown in FIG. 4, using I and Q coordinates. FIG. 4 is a diagram for explaining the principle of the present invention. The abscissa is I and the ordinate is Q. It would be seen from FIG. 4 that the received signal is rotated from S(t) to S(t+Δt) by an angle Δθ during the time interval Δt. If these two signals S(t) and S(t+Δt) at the different times are represented by use of the IQ coordinates, S(t) and S(t+Δt) are expressed by the following equations.

$$S(t)=Ip(t)+jQ(t) \qquad (1_1)$$

$$S(t+\Delta t)=Ip(t+\Delta t)+jQ(t+\Delta t) \qquad (1_2)$$

where j means an imaginary component. Further, if the I component and Q component are represented by an amplitude component R and an angle component θ, S(t) and S(t+Δt) are expressed by the following equations.

$$S(t)=R(t)\{\cos\theta(t)+j\sin\theta(t)\} \qquad (2_1)$$

$$S(t+\Delta t)=R(t+\Delta t)\{\cos\theta(t+\Delta t)+j\sin\theta(t+\Delta t)\} \qquad (2_2)$$

If the I components and Q components of S(t) and S(t+Δt) are multiplied in a cross manner and the calculation results are added or subtracted, the following result is obtained.

$$I(t)*Q(t+\Delta t) - I(t+\Delta t)*Q(t) = \qquad (3)$$

$$R(t)*R(t+\Delta t)\{\cos\theta(t)*\sin\theta(t+\Delta t) - \cos(t+\Delta t)*\sin\theta(t)\} =$$

$$R(t)*R(t+\Delta t)\{\sin[\theta(t) - \theta(t+\Delta t)]\}$$

It would be seen from the equation (3) that a sine component of the angle displacement amount Δθ=[θ(t)−θ(t+Δt)] during the time interval from the time t to the time t+Δt is obtained. That the output of the equation (3) is zero, i.e., Δθ is set to "0" is equivalent to that a frequency displacement amount during the time interval Δt is set to "0". This can be obtained from an equation θ(t)=2πf(t), where f(t) is a frequency at a time t. Therefore, by controlling the VCO 9 such that the output of the equation (3) is set to zero, the frequency displacement amount of the received signal can be eliminated and the received signal can be stabilized in frequency. That is, one feature of the present invention is that the frequency control signal calculating circuit 4 includes a section for controlling the VCO 9 such that $$R(t)*R(t+\Delta t)\{\sin(\theta(t)-\theta(t+\Delta t))\}$$

becomes "0", where R(t), R(t+Δt), θ(t) and θ(t+Δt) are signals synthesized from the quadrature signals (I and Q) at the times t and Δt represented with an amplitude component R and an angle component θ. The analog to digital (A/D) converters $5_1$ and $5_2$ each for converting an analog signal into a digital signal are provided at the output sides of the quadrature modulator 2.

In the spread spectrum communication system, an information sequence is multiplied by a spreading code sequence having a frequency higher than that of the information sequence and transmitted from the transmitting apparatus. In the receiving apparatus, the despreading process is performed to the received signal using the spreading code sequence to retrieve the information sequence. The PN code sequence is generally used for the spreading and despreading. The PN code sequence is characterized in that the self-correlation function is a δ function. The PN code sequence has a maximum correlation result when the synchronization is completely established between the transmitting side and the receiving side, and a value approximately equal to "0" otherwise. That is, in a case where the spreading code sequence used for the despreading in the receiving apparatus completely matches to the spreading code sequence used for the spreading in the transmitting apparatus with respect to time and phase, the correlation result has a maximum. Therefore, in order to control the VCO 9 which is used to drive the PN spreading code generator 3 for generating the despreading code sequence, information of whether the correlation result is maximum is used. In the present invention, the power values obtained by performing the despreading (correlation) to the I component and Q component of the signal received at the different times t and t+Δt, and by squaring the despreading results and adding the squaring results are compared in magnitude. The control signal obtained from the equation (3) is controlled in accordance with the comparing result. Thereby, it is made possible that the circuit is simplified and the number of correlation circuits necessary for frequency synchronization and the number of processing steps in the circuits are reduced. Accordingly, there can be realized the spread spectrum signal receiving apparatus having a frequency synchronization holding unit in which the power consumption of the whole receiving apparatus is reduced.

Next, the operation of the embodiment of the present invention will be described. A signal received by the receive antenna 1 is subjected to quadrature demodulation by the quadrature demodulator 2 in response to the clock signal generated by a VCO 9 to produce an I component and a Q component of the demodulated signal. The I and Q components are inputted into A/D converters to $5_1$ and $5_2$ and converted digital signals. The outputs of the A/D converter $5_1$ and $5_2$ are outputted to despreading correlation demodulators $7_1$ to $7_4$, respectively. The despreading correlation demodulator $7_1$ performs the despreading correlation demodulation to the I component of an information channel and the despreading correlation demodulator $7_2$ performs the despreading correlation demodulation to the I component of a pilot channel. The despreading correlation demodulator $7_3$ performs the despreading correlation demodulation to the Q component of the pilot channel and the despreading correlation demodulator $7_4$ performs the despreading correlation demodulation to the Q component of the information channel. The despreading correlation demodulators $7_1$ to $7_4$ differ from each other in the used signals and PN codes sequence but have the same circuit structure. Each of the despreading correlation demodulators $7_1$ to $7_4$ includes a multiplier and a summing circuit.

A spreading code generator 3 generates, for the I and Q components, the PN code sequences which are used for the despreading in the despreading correlation demodulators $7_1$ to $7_4$, in response to the clock signal generated by the VCO 9. In the embodiment of the present invention, PNi(d), PNq(d), PNi(p) and PNq(p) are generated for the I component and Q component of the information channel and the I component and Q component of the pilot channel as the PN codes sequences, respectively.

For instance, in the despreading correlation modulator $7_1$, the despreading process is performed to the output of the A/D converter $5_1$ using the PN code sequence PNi(d) generated by the spreading code generator 3. Actually, the PNi(d) and the output of the A/D converter $5_1$ are multiplied by a multiplier $6_1$ and the multiplying results are added by a summing circuit 8 by a predetermined number. The outputs Id and Qd of the despreading correlation demodulator $7_1$ and $7_4$ for the I component and Q component of the information channel are outputted to the next stage demodulating circuit and the outputs Ip and Qp of the despreading correlation demodulators $7_2$ and $7_3$ for the I component and Q component of the pilot channel are outputted to the frequency control signal calculating circuit 4 and the next stage demodulating circuit.

Figure 5:
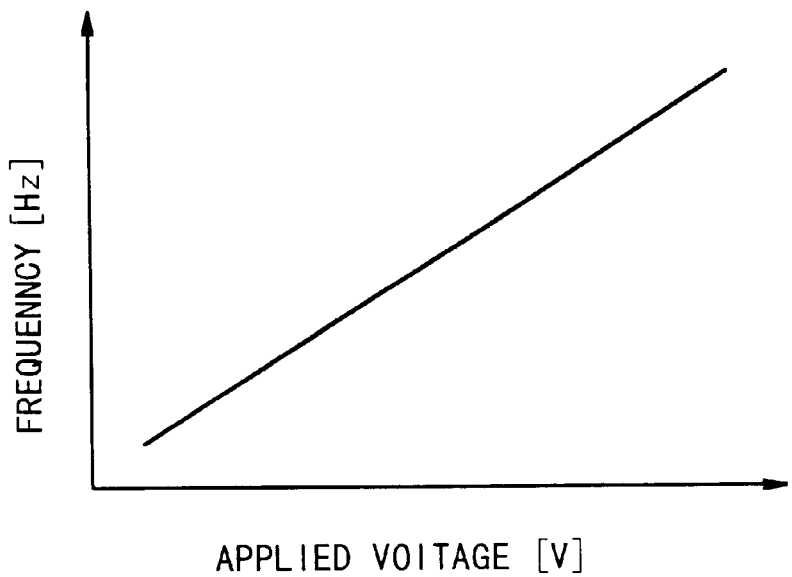
FIG. 5 is a diagram showing the voltage - frequency characteristic of a VCO.

The frequency control signal calculating circuit 4 will be described with reference to FIGS. 5 to 11. FIG. 5 is a graph indicating the voltage-frequency characteristic of the VCO 9. The abscissa is an applied voltage (V) and the ordinate is frequency (Hz). What has the voltage-frequency characteristic shown in FIG. 5 is used as the VCO 9 for generating the clock signal. Thereby, it is made possible to increase the frequency of the clock signal by making the voltage greater and to decrease the frequency by making the voltage smaller.

FIGS. 6 to 11 are diagrams for explaining the internal structure of examples of frequency control signal calculating circuit 4 which has the circuit structure as shown in FIGS. 6 to 11 in such a manner that only the calculation result a of the equation (3). Also, the frequency control signal calculating circuit outputs a control signal fcont to the VCO 9 for generating the clock signal which is used to drive the spreading code generator 3 and the quadrature demodulator 2 for controlling them. These examples will be described.

First, referring to FIG. 6, a first example of frequency control signal calculating circuit 4 will be described. The first example of frequency control signal calculating circuit 4 is composed of summing circuits $10_1$ and $10_2$ for signals Ip and Qp, delay circuits $11_1$ and $11_2$, multipliers $6_2$ and $13_2$, a subtracter $12_1$, a multiplier $6_4$, and a negative feed back circuit composed of an adder $12_2$ and a delay circuit 13.

In the first example of frequency control signal calculating circuit, the input signals Ip and Qp from the despreading correlation demodulators $7_2$ and $7_3$ are summed by summing circuits $10_1$ and $10_2$, respectively to produce signals Ip(t) and Qp(t). This operation functions as low pass filtering of the despread signals to remove the effect of high frequency components of an undesired signal such as a noise signal generated on the transmission path such as air. Further, it is possible to vary the filter characteristic by changing the summing time or time constant based on a noise state on the transmission path. Using the signal Ip(t) and Qp(t) obtained by filtering the high frequency component of the despread signals and the signals Ip(t−Δt) and Qp(t−Δt) which are received and despread before the current time by a time interval Δt, and which are previously filtered and delayed by the delay elements $11_1$ and $11_2$, the equation (3) is calculated. That is, the signals Ip(t−Δt) and Qp(t) are multiplied by the multiplier $6_2$ and the signals Ip(t) and Qp(t−Δt) are multiplied by the multiplier $13_2$. The multiplication result of the multiplier $13_2$ is subtracted from the multiplication result of the multiplier $6_2$ to obtain the calculation result a of the equation (3). The subtraction result is multiplied by a predetermined coefficient k in the multiplier $6_4$. The above-mentioned coefficient k is a coefficient relating to a response of control and is referred to as a response coefficient k. This multiplication makes the response speed of frequency control signal fcont change. The value of the coefficient is made small for dull response. The multiplication result of the multiplier $6_4$ is supplied to the adder $12_2$ and added to the negative feed back amount of the frequency control signal fcont. The addition result is delayed by the delay circuit 13 and the delayed result is supplied as the frequency control signal fcont.

In a case where the frequency of the received signal is late compared with the frequency of a signal generated in the receiving apparatus, that is, the received signal is rotated into a positive direction as shown in FIG. 4 (note that although the time t and time t+Δt are described in FIG. 4, the relation is the same as the relation between time t−Δt and t), the output of equation (3) is sin θ(t−Δt)−θ(t)]. It becomes a positive value and the value of frequency control signal fcont increases, i.e., the frequency of the clock signal generated by the VCO 9 is controlled to be increased. Thereby, the frequency synchronization between the clock signal used in the receiving apparatus and the received signal is controlled.

Figure 6:
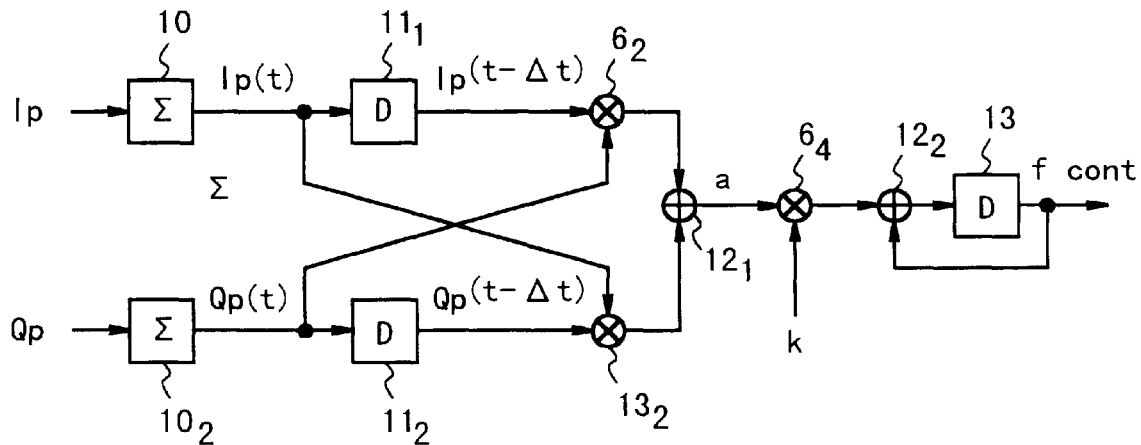
FIG. 6 is a diagram for explaining the inner structure of a first example of frequency control signal calculating circuit.
Figure 7:
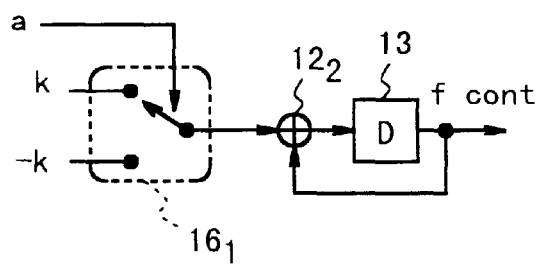
FIG. 7 is a diagram for explaining the inner structure of a second example of frequency control signal calculating circuit.

In the circuit which is shown in FIG. 7, the multiplier $6_4$ is replaced by a control switch $16_1$ in the circuit shown in FIG. 6. That is, the circuit which performs the frequency holding only using the information indicative of whether the calculation result a of the equation (3) is positive or negative. This means that the frequency holding operation is performed based on only information indicative of whether the direction of frequency shift is positive or negative. In the control switch $16_1$, when the subtraction result a of the subtracter $12_1$, is positive, a response coefficient of k is selected, and when the subtraction result a is negative, the response coefficient −k is selected. The selected response coefficient is supplied to the next stage negative feed back circuit. In this circuit structure, reduction of circuit size is realized by elimination of multiplying in the multiplier $6_4$. According to the method, the frequency synchronization between the clock signal used in the receiving apparatus and the received signal is controlled.

Figure 8:
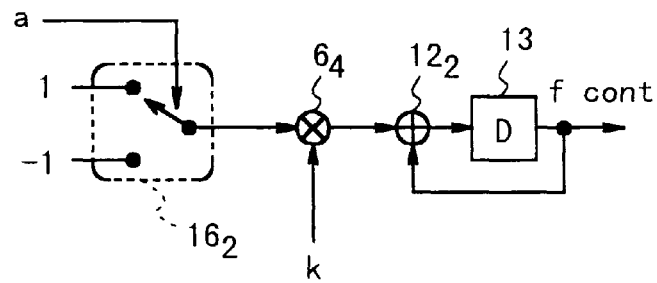
FIG. 8 is a diagram for explaining the inner structure of a third example of frequency control signal calculating circuit.

The circuit which is shown in FIG. 8 is a variation of the circuit shown in FIG. 7. The control switch $16_1$ of FIG. 7 is replaced by a control switch $16_2$ and the multiplier $6_4$. A control switch $16_2$ outputs a value based on the calculation result a of equation (3) such that "1" is selected when the calculation result a is positive and "−1" is selected when the calculation result a is negative. The output is multiplied by the response coefficient k in the multiplier $6_4$, and the frequency control signal fcont is calculated in a next stage negative feed back circuit and outputted from it. In this manner, the frequency synchronization between the clock signal used in the receiving apparatus and the received signal is controlled. In this circuit structure, it can be made easy to appropriately change the response speed for the frequency control on the reception way, by changing the response coefficient k to be multiplied. Similarly, in the circuit structure shown in FIG. 7, the response speed for the frequency control can be changed by selecting response coefficient of k or −k. In this case, however, two coefficients must be changed at the same time for changing the response speed.

Figure 9:
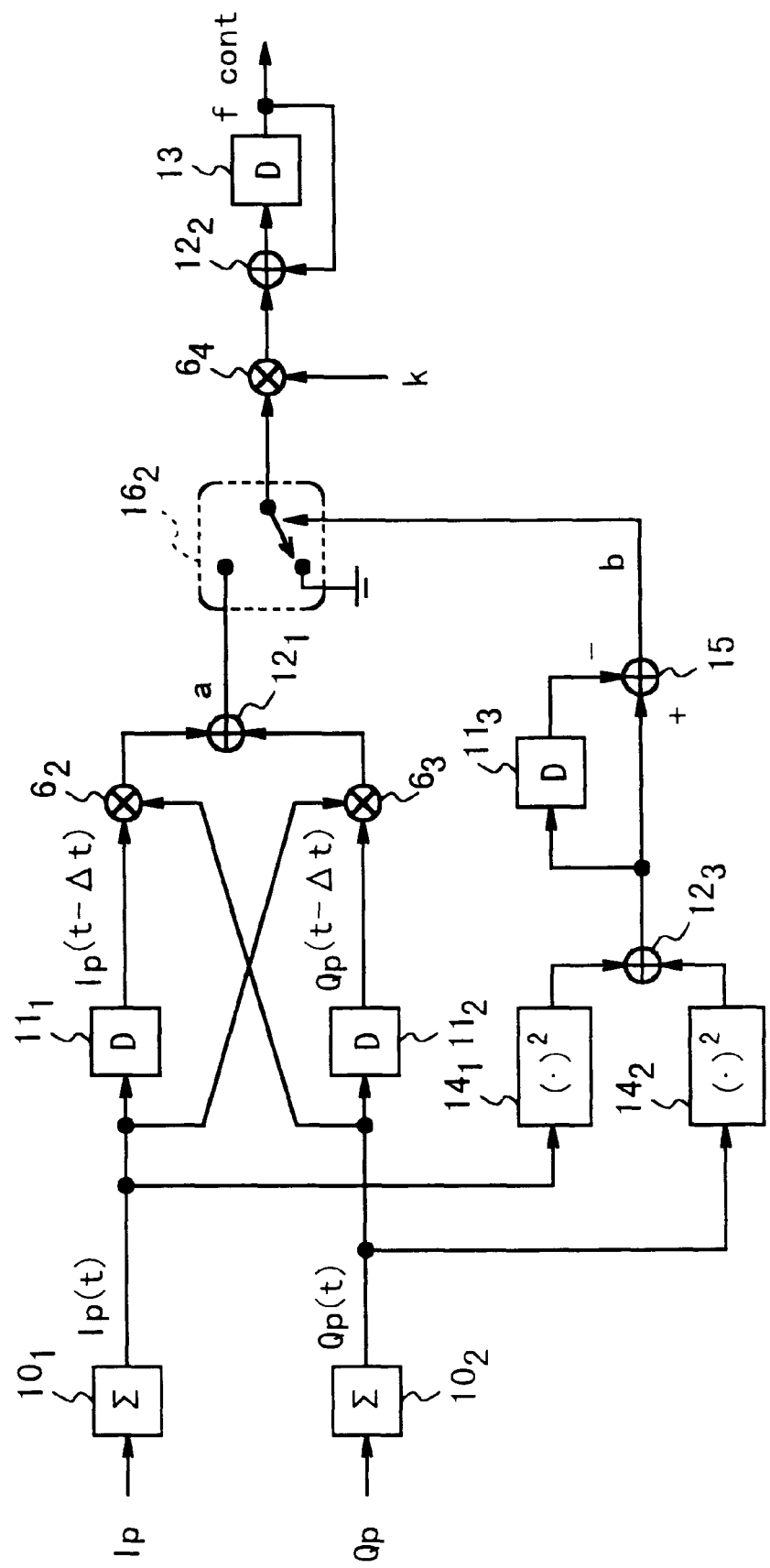
FIG. 9 is a diagram for explaining the inner structure of a fourth example of frequency control signal calculating circuit.

In the circuit shown in FIG. 9, there are added to the circuit shown in FIG. 8, squaring circuits $14_1$ and $14_2$, an adder $12_3$, a delay circuit $11_3$ and a subtracter 15. Also, the calculation result a is connected to one node of the control switch $16_2$. The other node of the control switch $16_2$ is connected to the ground. The control switch $16_2$ is controlled by a subtraction result b of the subtracter 15. The signals Ip(t) and Qp(t) are supplied to the squaring circuits $10_1$ and $10_2$ and squared. The squared results are added by the adder $12_3$. The addition result of the adder $12_3$ is supplied to the subtracter 15 and the delay circuit 113. In the subtracter 15, a signal previously supplied and delayed by the delay circuit $11_3$ is subtracted from the addition result of the adder $12_3$ to produce the subtraction result b.

The signals Ip and Qp inputted from the despreading correlation demodulators $7_2$ and $7_3$ are summed in summing circuits $10_1$ and $10_2$, respectively, to filter the signals to remove a high frequency component of noise generated on the transmission path. The filtered signals are Ip(t) and Qp(t). The equation (3) is calculated using the signals Ip(t) and Qp(t), and IP(t−Δt) and QP(t−Δt) in delay elements $11_1$ and $11_2$. The calculation result a is supplied to the control switch 162. At the same time, the value of the control signal fcont is controlled based on the magnitudes of powers of Ip(t) and Qp(t) received at different times. The output IP(t) and QP(t) of the summing circuits $10_1$ and $10_2$ are squared by the squaring circuits $10_1$ and $10_2$, respectively. The results are added by the adder $12_3$ to derive a reception power P(t) at time t. By subtracting the power P(t−Δt) at the time (t−Δt) which is in a delay element $11_3$, from the power P(t), the change b of the reception power during a time interval Δt can be determined. In a case where the output of the subtracter 15 is positive, that is, the frequency is shifted in a direction in which the despreading correlation result of the received signal using the PN code sequence in the receiving apparatus during a time interval Δt increases, "0" (the ground short-circuit means "0" in FIG. 9) is selected in the control switch $16_2$. As a result, the control is performed in such a manner that the calculation result a of the equation (3) is not supplied to the next stage negative feed back circuit. In this case, "0" is added in the negative feed back circuit composed of the adder $12_2$ and the delay element 13. As a result, the frequency control signal fcont does not change, so that the same frequency control signal as before time interval Δt is outputted. On the other hand, on the contrary, in a case where the subtraction result b of the adder 15 is negative, the control switch $16_2$ is controlled in such a manner that the calculation result a of the equation (3) is supplied to the next stage negative feed back circuit, because the frequency is shifted in a direction in which the despreading correlation result of the received signal using the PN code sequence in the receiving apparatus is decreased. As a result, the control signal fcont changes. In this manner, by comparing the power value of the despreading correlation result of the received signal using the PN code sequence in the receiving apparatus and then by controlling the frequency control signal fcont, the frequency synchronization is performed for the clock signal used in the receiving apparatus such that the despreading correlation result of the received signal using the PN code sequence in the receiving apparatus always has a maximum.

Figure 10:
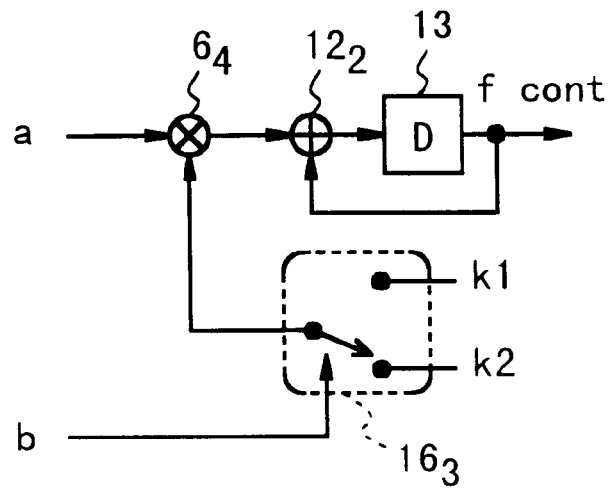
FIG. 10 is a diagram for explaining the inner structure of a fifth example of frequency control signal calculating circuit.

In the frequency control signal calculating circuit 4 of FIG. 9, whether the calculation result a of the equation (3) is to be supplied is controlled in accordance with the subtraction result b of the despreading correlation power in each time. The calculation result a of the equation (3) is supplied to the next stage negative feed back circuit only when the frequency is shifted into the direction which the despreading correlation result of the received signal using the PN code sequence in the receiving apparatus decreases. In this case, however, there is the possibility that the response of automatic frequency control (AFC) cannot track abrupt frequency change as in a case of fading generated on the transmission path. For this reason, in the circuit which is shown in FIG. 10 the calculation result a is always supplied to the multiplier $6_4$. Also, a control switch $16_3$ is provided in place of the control switch $16_2$ and the control switch selects one of the two coefficients k1 and k2 in response to the subtraction result b. As a result, the response coefficient to be multiplied to the calculation result a of the equation (3) is selected in accordance with the subtraction result b, i.e., the change of power. This enables the frequency control signal to be controlled. That is, in a case where the subtraction result b is positive, the frequency is shifted in a direction in which the despreading correlation result of the received signal using the PN code sequence in the receiving apparatus increases, the response coefficient k1 is set to a small value such that the calculation result a of the equation (3) influences to the next stage negative feed back circuit by a small amount, resulting in dull response of the frequency control signal fcont. On the other hand, in a case where the subtraction result b is negative, the response coefficient k2 is set to a great value such that the calculation result a of the equation (3) influences to the next stage negative feed back circuit by a great amount, resulting in sharp response of the control signal fcont. Thus, it is made possible to change the response speed of the frequency synchronization of the clock signal used in the receiving apparatus such that the despreading correlation result of the received signal using the PN code sequence in the receiving apparatus has a maximum.

Figure 11:
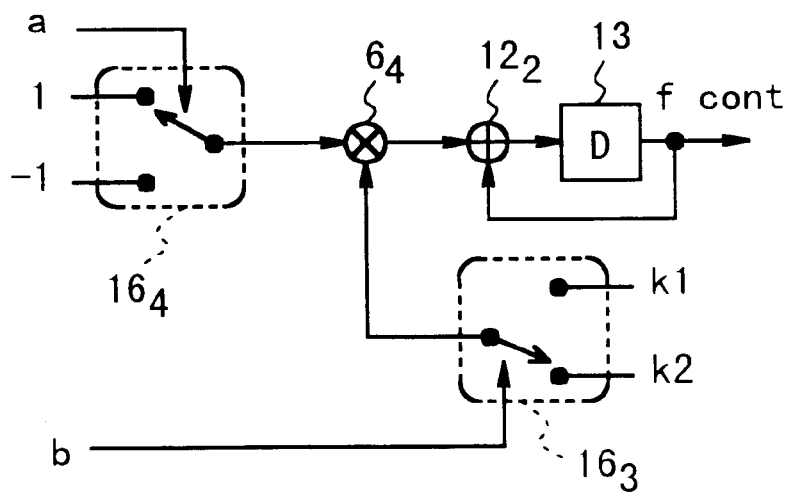
FIG. 11 is a diagram for explaining the inner structure of a sixth example of frequency control signal calculating circuit.

The circuit which is shown in FIG. 11 is a modification of circuit shown in FIG. 10. In this circuit, a control switch $16_4$ is provided between the subtracter $12_1$, and the multiplier $6_4$. The control switch $16_4$ is controlled by the calculation result a and outputs one of the positive/negative values of the response coefficient, i.e., "1" or "−1" in accordance with the positive/negative value of the calculation result a of the equation (3). Also, the control switch $16_3$ selects the magnitude of response coefficient to be multiplied in the multiplier $6_4$ in accordance with the positive/negative value of the change b of power when the despreading correlation is performed to the received signal after the time interval Δt by use of the PN code sequence. Thus, the response coefficient k1 (or k2) which is selected in accordance with the comparing result b of the despreading correlation power is multiplied by the information indicative of whether the shift of the frequency is in a positive direction or in a negative direction, i.e., "1" (or "−1") which is selected in accordance with the calculation result of the equation (3) in the multiplier $6_4$. The output of the multiplier $6_4$ is supplied to the next stage negative feed back circuit. In this manner, the response speed for the frequency synchronization of the clock signal used in the receiving apparatus can be changed such that the despreading correlation result of the received signal and the PN code sequence of the receiving apparatus has a maximum, resulting in making reliable frequency synchronization possible.

Figure 12:
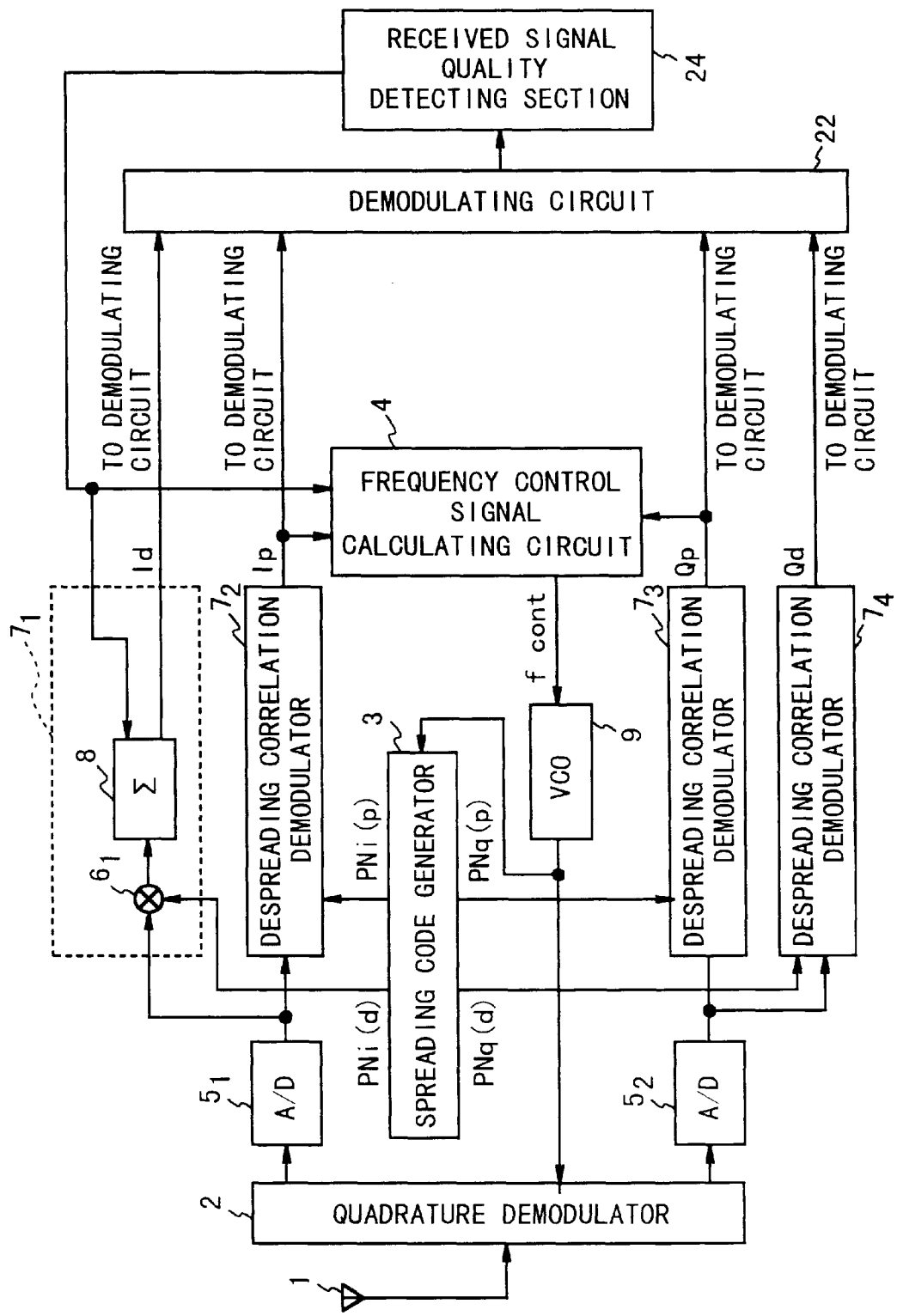
FIG. 12 is a structural block diagram of an apparatus according to another embodiment of the present invention.

FIG. 12 is a block diagram showing the spread spectrum signal receiving apparatus according to the second embodiment of the present invention. In the circuit shown in FIG. 12, a demodulating circuit 22 and a received signal quality detecting section 24 are added to the circuit shown in FIG. 3. The detecting section 24 detects the received signal quality through frame error rate or symbol error rate using the known technique, and controls the summing circuits 101 and 102 of the frequency control signal calculating circuit 4 and/or the summing circuits 8 of the despreading correlation demodulators 71 to 74 in the time constant or the number of summing times.

As described above, according to the present invention, the circuit can be simplified and made small in size. Thereby, the power consumption can be reduced. Also, preferably, received power values are calculated at predetermined different times from the outputs of the despreading correlation demodulators, and the response speed of frequency control signal is controlled in accordance with change of the calculated power values. Thereby, the response speed of the VCO can be changed based on whether the received power values abruptly change due to fading or the like or slowly change. Thus, unnecessary "variation" in the frequency of the clock signal can be avoided. In order to change the response speed, the control signal may be multiplied by a predetermined coefficient. Further, preferably, low pass filters passing the quadrature signals are provided to remove their high frequency noise components. Furthermore, preferably, a time constant is appropriately changed in accordance with a state of a transmission path. As a result, precision of the control signal to the VCO can be further improved.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A receiving apparatus in a spread spectrum system, comprising:

quadrature-demodulating means for demodulating a received signal in accordance with a clock signal to generate first and second quadrature components of an information signal and first and second quadrature components of a pilot signal;

spreading code generating means for generating a spreading code sequence which is the same as used on a transmission side, for each of said information signal first and second quadrature components and pilot signal first and second quadrature components in response to said clock signal;

despreading means for despreading each of said information signal first and second quadrature components by use of the corresponding generated spreading code sequence;

frequency control signal generating means for generating a frequency control signal from said despread pilot signal first and second quadrature components, said control signal generating means including means for controlling said clock signal generating means such that $$R(t)*R(t+\Delta t)\{ \sin(\theta(t)-\theta(t+\Delta t))\}$$

is set to zero, where $R(t)$ and $\theta(t)$ are an amplitude and angle of a signal obtained by synthesizing said despread pilot signal first and second quadrature components at a time t, and $R(t+\Delta t)$ and $\theta(t+\Delta t)$ are an amplitude and angle of a signal obtained by synthesizing said despread pilot signal first and second quadrature components at a time $(t+\Delta t)$; and clock signal generating means for generating said clock signal in accordance with said frequency control signal to supply said clock signal to said quadrature-demodulating means and said spreading code generating means.

2. A receiving apparatus according to claim 1, wherein said clock signal generating means includes means for generating said clock signal having a frequency determined based on a voltage level of said frequency control signal.

3. A receiving apparatus according to claim 1, wherein said frequency control signal generating means includes:

a first delay circuit for delaying a first component signal corresponding to said pilot signal first quadrature component by a predetermined time interval;

a second delay circuit for delaying a second component signal corresponding to said pilot signal second quadrature component by the predetermined time interval;

a first multiplier for multiplying said delayed first component signal by said second component signal to obtain a first multiplication result;

a second multiplier for multiplying said delayed second component signal by said first component signal to obtain a second multiplication result;

a subtracter for subtracting said second multiplication result from said first multiplication result to obtain a subtraction result;

base control signal generating means for generating a base control signal by use of the subtraction result; and a negative feed back circuit composed of an adder and a delay circuit, for generating said frequency control signal in accordance with the base control signal, wherein said adder negatively adds said frequency control signal to the base control signal to establish a negative feed back loop, and said delay circuit delays the addition result of said adder to supply said frequency control signal to said clock signal generating means and said adder.

4. A receiving apparatus according to claim 3, wherein said frequency control signal generating means further comprises removing means for removing high frequency noise components from said pilot signal first and second quadrature components to supply said removed pilot signal first and second quadrature components to said first and second delay circuits and said first and second multipliers as said first and second component signals.

5. A receiving apparatus according to claim 4, wherein said removing means includes summing circuits for summing said pilot signal first and second quadrature components for a predetermined time interval, respectively.

6. A receiving apparatus according to claim 3, wherein said base control signal generating means includes means for multiplying said subtraction result by a predetermined coefficient.

7. A receiving apparatus according to claim 3, wherein said base control signal generating means includes:
   a selector for selecting one of two predetermined coefficients in accordance with said subtraction result to supply the selected coefficient to said negative feed back circuit as the base control signal.

8. A receiving apparatus according to claim 3, wherein said base control signal generating means includes:
   a selector for selecting one of two predetermined values in accordance with said subtraction result; and
   means for multiplying a predetermined coefficient to the selected value to supply the multiplication result to said negative feed back circuit as the base control signal.

9. A receiving apparatus according to claim 1, wherein said frequency control signal generating means includes:
   a first delay circuit for delaying a first component signal corresponding to said pilot signal first quadrature component by a predetermined time interval;
   a second delay circuit for delaying a second component signal corresponding to said pilot signal second quadrature component by the predetermined time interval;
   a first multiplier for multiplying said delayed first component signal by said second component signal to obtain a first multiplication result;
   a second multiplier for multiplying said delayed second component signal by said first component signal to obtain a second multiplication result;
   a first subtracter for subtracting said second multiplication result from said first multiplication result to obtain a first subtraction result;
   base control signal generating means for generating a base control signal by use of the first subtraction result and a second subtraction result;
   a negative feed back circuit composed of a first adder and a first delay circuit, for generating said frequency control signal in accordance with the base control signal, wherein said first adder negatively adds said frequency control signal to the base control signal to establish a negative feed back loop to obtain a first addition result, and said first delay circuit delays the first addition result of said first adder to supply said frequency control signal to said clock signal generating means and said adder;
   a first squaring circuit for squaring said first component signal;
   a second squaring circuit for squaring said second component signal;
   a second adder for adding the squared first component signal and the squared second component signal to obtain a second addition result;
   a second delay circuit for delaying the second addition result of said second adder; and
   a second subtracter for subtracting the delayed second addition result by said second delay circuit to obtain said second subtraction result for supplying said second subtraction result to said base control signal generating means.

10. A receiving apparatus according to claim 9, wherein said frequency control signal generating means further comprises removing means for removing high frequency noise components from said pilot signal first and second quadrature components to supply said removed pilot signal first and second quadrature components to said first and second delay circuits and said first and second multipliers as said first and second component signals.

11. A receiving apparatus according to claim 10, wherein said removing means includes summing circuits for summing said pilot signal first and second quadrature components for a predetermined time interval, respectively.

12. A receiving apparatus according to claim 9, wherein said base control signal generating means includes:
   a selector for selecting one of two predetermined coefficients in accordance with said second subtraction result; and
   a second multiplier for multiplying said first subtraction result by said selected coefficient to supply the multiplied result to said negative feed back circuit as the base control signal.

13. A receiving apparatus according to claim 9, wherein said base control signal generating means includes:
   a first selector for selecting one of two predetermined values in accordance with said first subtraction result;
   a second selector for selecting one of two predetermined coefficients in accordance with said second subtraction result; and
   a second multiplier for multiplying said selected value by said selected coefficient to supply the multiplied result to said negative feed back circuit as the base control signal.

14. A receiving apparatus according to claim 1, wherein the frequency control signal is derived from self-correlation functions of the despread pilot signal components.

15. A method of demodulating a received signal in a spread spectrum system, comprising the steps of:
   demodulating a received signal in accordance with a clock signal to generate first and second quadrature components of an information signal and first and second quadrature components of a pilot signal;
   generating a spreading code sequence which is the same as used on a transmission side, for each of said information signal first and second quadrature components and pilot signal first and second quadrature components in response to said clock signal;
   despreading each of said information signal first and second quadrature components and pilot signal first and second quadrature components by use of the corresponding generated spreading code sequence;
   generating a frequency control signal from said despread pilot signal first and second quadrature components; and
   generating said clock signal in accordance with said frequency control signal, said clock signal being supplied to said steps of demodulating said received signal and generating said spreading code sequence.

16. A method according to claim 15, wherein said step of generating said clock signal includes generating said clock signal having a frequency determined based on a frequency control signal.

17. A method according to claim 15, wherein said step of generating said frequency control signal includes:
   generating said frequency control signal corresponding to change between a first despread pilot signal composed of the despread pilot signal first and second quadrature components at a first time and a second despread pilot signal composed of the despread pilot signal first and second quadrature components at a second time.

18. A method according to claim 15, wherein said step of generating said frequency control signal includes generating said frequency control signal corresponding to a difference between a first despread pilot signal composed of the despread pilot signal first and second quadrature components at a first time and a second despread pilot signal composed of the despread pilot signal first and second quadrature components at a second time.

19. A method according to claim 18, wherein said step of generating said frequency control signal includes generating said frequency control signal corresponding to a coefficient in addition to said difference.

20. A method according to claim 15, wherein said step of generating said frequency control signal includes generating said frequency control signal corresponding to a coefficient and a difference between a first despread pilot signal composed of the despread pilot signal first and second quadrature components at a first time and a second despread pilot signal composed of the despread pilot signal first and second quadrature components at a second time.

21. A method according to claim 20, wherein said step of generating said frequency control signal includes selecting one from among two coefficients in accordance with a difference between a power of said first despread pilot signal at a third time and a power of said second despread pilot signal at a fourth time.

22. A method according to claim 15, wherein said step of generating said frequency control signal includes removing high frequency noise components from said despread pilot signal first and second quadrature components.

23. A method according to claim 22, further comprising the steps of:
detecting quality of the received signal from said information signal first and second quadrature components and said pilot signal first and second quadrature components; and
summing said pilot signal first and second quadrature components for a time interval determined based on the detected quality to remove the high frequency noise components.

24. A method according to claim 15, wherein the frequency control signal is generated using self-correlation functions of the despread pilot signal components.

25. A method according to claim 15, in which said control signal generating means includes means for controlling said clock signal generating means such that $$R(t)*R(t+\Delta t)\{ \sin(\theta(t)-\theta(t+\Delta t)) \}$$

is set to zero, where $R(t)$ and $\theta(t)$ are an amplitude and angle of a signal obtained by synthesizing said despread pilot signal first and second quadrature components at a time t, and $R(t+\Delta t)$ and $\theta(t+\Delta t)$ are an amplitude and angle of a signal obtained by synthesizing said despread pilot signal first and second quadrature components at a time $(t+\Delta t)$.

26. A method according to claim 15, wherein said step of generating said clock signal comprises correcting the frequency of said clock signal in accordance with said frequency control signal.

27. A spread spectrum signal receiving apparatus comprising:
demodulating means for demodulating a received signal in accordance with a clock signal to generate first and second quadrature components of an information signal and first and second quadrature components of a pilot signal;
spreading code generating means for generating a spreading code sequence which is the same as used on a transmission side, for each of said information signal first and second quadrature components and pilot signal first and second quadrature components in response to said clock signal;
despreading means for despreading each of said information signal first and second quadrature components and pilot signal first and second quadrature components by use of the corresponding generated spreading code sequence;
frequency control signal generating means for generating said frequency control signal based on said despread pilot signal first and second quadrature components; and
clock signal generating means for generating said clock signal in accordance with said frequency control signal to supply said clock signal to said demodulating means and said spreading code generating means.

28. A spread spectrum signal receiving apparatus according to claim 27, wherein said clock signal generating means includes means for generating said clock signal having a frequency determined based on a frequency control signal.

29. A spread spectrum signal receiving apparatus according to claim 27, wherein said frequency control signal generating means includes:
means for generating said frequency control signal corresponding to change between a first despread pilot signal composed of the despread pilot signal first and second quadrature components at a first time and a second despread pilot signal composed of the despread pilot signal first and second quadrature components at a second time.

30. A spread spectrum signal receiving apparatus according to claim 27, wherein said frequency control signal generating means includes means for generating said frequency control signal corresponding to a difference between a first despread pilot signal composed of the despread pilot signal first and second quadrature components at a first time and a second despread pilot signal composed of the despread pilot signal first and second quadrature components at a second time.

31. A spread spectrum signal receiving apparatus according to claim 27, wherein said frequency control signal generating means includes means for generating said frequency control signal corresponding to a predetermined coefficient.

32. A spread spectrum signal receiving apparatus according to claim 27, wherein said frequency control signal generating means includes means for generating said frequency control signal corresponding to a coefficient and a difference between a first despread pilot signal composed of the despread pilot signal first and second quadrature components at a first time and a second despread pilot signal composed of the despread pilot signal first and second quadrature components at a second time.

33. A spread spectrum signal receiving apparatus according to claim 32, wherein said frequency control signal generating means includes means for selecting one from among two coefficients in accordance with a difference between a power of said first despread pilot signal at a third time and a power of said second despread pilot signal at a fourth time.

34. A spread spectrum signal receiving apparatus according to claim 27, wherein said frequency control signal generating means includes means for removing high frequency noise components from said despread pilot signal first and second quadrature components.

35. A spread spectrum signal receiving apparatus according to claim 33, further comprising:

means for detecting quality of the received signal from said information signal first and second quadrature components and said pilot signal first and second quadrature components; and summing means for summing said pilot signal first and second quadrature components for a time interval determined based on the detected quality to remove the high frequency noise components.

36. An apparatus according to claim 27, in which said control signal generating means includes means for controlling said clock signal generating means such that $$R(t)*R(t+\Delta t)\{\sin(\theta(t)-\theta(t+\Delta t))\}$$

is set to zero, where $R(t)$ and $\theta(t)$ are an amplitude and angle of a signal obtained by synthesizing said despread pilot signal first and second quadrature components at a time t, and $R(t+\Delta t)$ and $\theta(t+\Delta t)$ are an amplitude and angle of a signal obtained by synthesizing said despread pilot signal first and second quadrature components at a time $(t+\Delta t)$.

37. An apparatus according to claim 27, wherein said clock signal generating means for generating said clock signal comprises means for correcting the frequency of said clock signal in accordance with said frequency control signal to produce said clock signal.

* * * * *